215
H. Pace, Sr.
Bed Bottom,
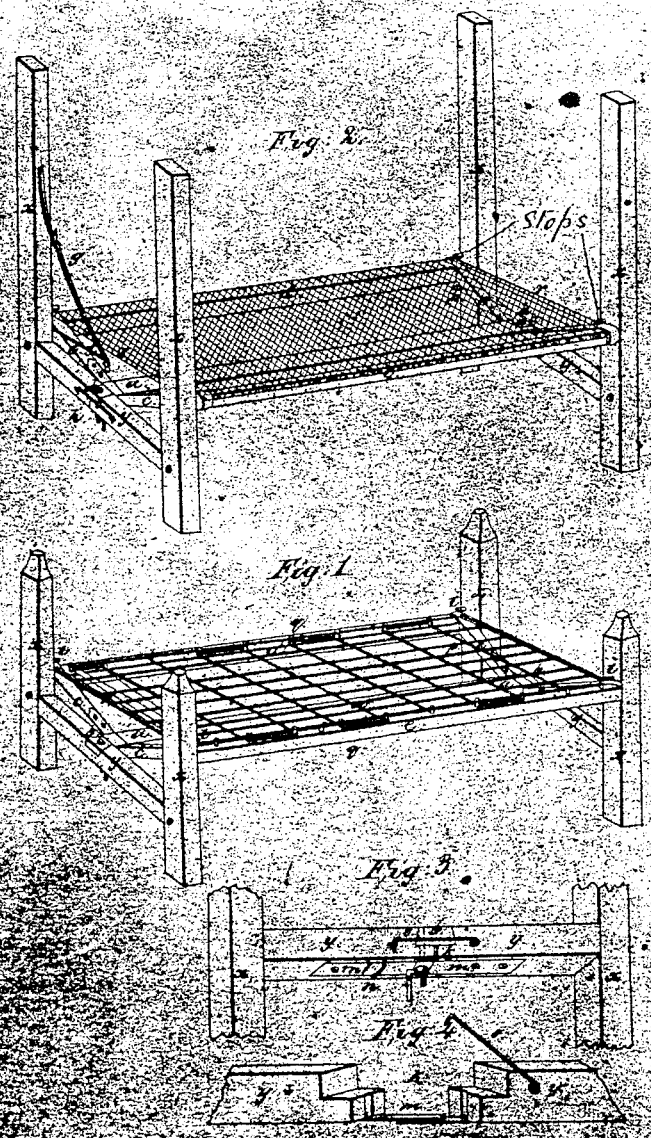
A.I. No. 99. A.I. Patented Nov. 4, 1851.